Patented Aug. 22, 1950

2,520,097

UNITED STATES PATENT OFFICE 2,520,097

PRODUCTION OF ALKYL PYRIDINES

George W. Hearne, El Cerrito, and Vernon W. Buls, Berkeley, Calif., assignors to Shell Development Company, San Francisco, Calif., a corporation of Delaware No Drawing. Application June 2, 1947, Serial No. 751,968

8 Claims. (Cl. 260—290)

This invention relates to the production of alkyl pyridines and relates more particularly to an improved process for the more efficient production of methyl pyridines. Still more particularly the invention relates to the production of 2-methyl pyridine (beta-picoline).

The alkyl pyridines such as for example, the methyl pyridines, are of importance not only because of their utilization as such in many fields of application but because of their value as starting or intermediate materials in the production of valuable derivatives thereof comprising dyes, pharmaceuticals and many other chemicals. Of the methyl pyridines 2-methyl pyridine (beta-picoline) is of prime importance as a starting material for the production of the anti-pellagra vitamin niacin (nicotinic acid).

Though methods have been disclosed heretofore for the interaction of certain aldehydes with ammonia to form reaction products comprising alkyl pyridines, such processes are generally handicapped by difficulties rendering impractical their large-scale utilization. A particular disadvantage of such processes available heretofore is the inevitable production of reaction mixtures comprising only relatively small amounts of the desirable alkyl pyridine and/or a relative inability to effect efficient conversion of the charge to products comprising substantial amounts of a particularly desired alkyl pyridine such as, for example, beta-picoline. Of these processes those enabling the production of reaction products comprising representative amounts of a specific alkyl-pyridine such as, for example, beta-picoline, are generally further handicapped by an ability to convert the charge material to such a specific product in representative amounts only when employing throughput rates which are so low as to render large scale practical operation of the process unfeasible.

It is an object of the present invention to provide an improved process for the more efficient production of alkyl-substituted pyridines. A more specific object of the invention is the provision of an improved process for the more efficient production of methyl pyridines from alpha,beta-unsaturated straight chain aliphatic aldehydes and ammonia. A particular object of the invention is the provision of an improved process for the more efficient production of beta-picoline from acrolein and ammonia. Other objects and advantages of the invention will become apparent from the following detailed description thereof.

The objects and advantages of the present invention are obtained by reacting an alpha,beta-unsaturated aliphatic aldehyde, such as, for example, acrolein, with ammonia, and/or an aliphatic primry amine, at a temperature in the range of from about 200° C. to about 500° C. in the presence of a compound of boron and phosphorus as a catalyst.

In carrying out the process of the invention the alpha,beta-unsaturated aliphatic aldehyde, such as, for example, acrolein, need not be employed in the pure state but may comprise lesser amounts of other materials such as, for example, hydrocarbons and other oxygenated hydrocarbons capable or not of undergoing conversion under the conditions employed. Such additionally present materials may comprise, for example, the paraffins such as, for example, methane, ethane, butane, pentane, hexane and their homologues, as well as the oxygenated derivatives thereof.

Ammonia, gases comprising ammonia, or compounds giving rise to ammonia under the reaction conditions, employed as charge to the system, may be obtained from any suitable source. Although the use of ammonia is preferred as the reactant providing the nitrogen atom, ammonia may be replaced in part or in its entirety with an aliphatic primary amine within the scope of the invention. Suitable aliphatic primary amines which may be employed comprise, for example, methylamine, ethylamine, n-propylamine, isopropylamine, n-butylamine, isobutylamine, the amylamines, the hexylamines, cyclopentylamine, methylcyclopentylamine, cyclohexylamine, and the like. If desired, more than one such amine may be charged to the reaction zone.

The introduction of ammonia and/or amine is preferably controlled to maintain a molar excess of ammonia or amine in the reaction zone. Lesser proportions of ammonia and/or amine may be employed, however, within the scope of the invention. A mol ratio of ammonia or amine, to aldehyde of from about 0.5 to about 20, and preferably from about 5 to about 15 may be employed.

Although the reaction is carried out efficiently without the aid of diluent materials, their use may be resorted to within the scope of the invention. Diluents comprising, for example, nitrogen, steam, and the like, may be admixed with the charge to the reaction zone, or may be separately introduced therein at one or more points along the length thereof.

Reaction of the alpha,beta-unsaturated aldehyde, such as acrolein, with the ammonia and/or aliphatic primary amine in the presence of the catalyst is effected at a temperature in the range of, for example, from about 200° C. to about 500° C., and preferably from about 300° C. to about 400° C. Atmospheric or superatmospheric pressures are employed. Throughput rates ranging from about 1 mol to about 150 mols of reactants per liter of catalyst per hour may be employed. A particular advantage of the invention, directly attributable in at least a substantial degree to the nature of the catalyst employed, resides in the ability to utilize high throughput rates without reduction in yield of the highly desirable alkyl pyridine such as, for example, beta-picoline. It is therefore preferred to execute the reaction with throughput rates of at least 25 mols and up to about 75 mols of reactants per liter of catalyst per hour.

The advantages in the production of alkyl pyridine such as, for example, beta-picoline by the reaction of an alpha-beta unsaturated straight chain aldehyde such as, for example, acrolein, with ammonia and/or a primary aliphatic amine, are obtained by the use of a catalyst consisting essentially of a compound of boron and phosphorus, such as, for example, boron phosphate. The invention is in no wise limited by the manner of production or source of the particular compound of boron and phosphorus, such as boron phosphate, employed as catalyst. The production of a boron phosphate catalyst particularly effective in obtaining the objects of the invention is exemplified by the following example:

Example I 824 grams of powdered boric acid was added to 1730 grams of 85% phosphoric acid with constant stirring. Stirring of the mixture was continued until all of the boric acid was dissolved and a gelatinous material formed. This was allowed to stand twenty hours, then dried at 110° C. The resulting dried product was baked four hours at 350° C. during which it expanded and hardened to a solid foam. The baked catalyst was then crushed and screened to 8-14 mesh before use.

The catalyst thus prepared may be employed as such or may be diluted with suitable inert solid diluents such as, for example, silica stone, crushed firebrick, pumice, clay, diatomaceous earth, etc. The catalyst may furthermore be employed in admixture with other materials such as, for example, adsorptive siliceous and aluminous materials as, for example, silica gel, activated alumina, and the like, which materials may or may not possess some degree of catalytic activity under the conditions of execution of the process.

The boron phosphate catalysts employed in the process of the invention are preferably subjected to a preconditioning treatment before use comprising the step of heating them at a temperature of from about 300° C. to about 400° C., and preferably from about 325° C. to about 375° C. in a stream of ammonia or aliphatic amine. Such pretreatment it has been found results in the obtaining of substantial improvements in the subsequent use of the catalyst in the execution of the process of the invention. Upon decline of activity of the catalyst during use in the process they are readily regenerated by heating in an oxygen-containing gas, such as, for example, air, flue gas, or the like, at a temperature in the range of from about 300° C. to about 500° C., optionally followed by continued heating at this temperature in a stream of ammonia or aliphatic amine.

Under the above-defined conditions an alpha,-beta-unsaturated aliphatic aldehyde will react with ammonia, and/or a primary aliphatic amine, to result in the production of reaction products comprising high yields of alkyl-substituted pyridines. Thus under these conditions, in the presence of a compound of boron and phosphorus as catalyst, acrolein will react with ammonia to result in reaction products comprising high yields of the highly desirable 2-methyl pyridine (beta-picoline). A particular advantage of the process of the invention directly attributable at least in part to the presence of a compound of boron and phosphorus is the ability to use substantially increased throughput rates without sacrifice of the high yields of the desirable beta-picoline as evidenced by the following example:

Example II

Acrolein in admixture with 10.7 mols of ammonia per 1.1 mol of acrolein was passed at a temperature of 360° C. over 190 cc. of the boron phosphate catalyst prepared in Example I above. The catalyst was pretreated by heating at a temperature of 350° C. in a stream of ammonia for 1 hour before use. A throughput rate of 40.4 mols of reactants per liter of catalyst per hour was employed. A conversion of acrolein to nitrogen bases of 53.92% was obtained. The nitrogen bases thus obtained contained 5.39% pyridine, 37.75% beta-picoline and 10.78% pyridine bases higher boiling than beta-picoline.

The substantial advantages inherent in the use of a compound of boron and phosphorus as catalyst in comparison with other catalysts is evidenced by the following example:

Example III

In ten separate operations acrolein was reacted with ammonia under the conditions and in the presence of the catalyst indicated in the following table for each of the runs. Conversion of acrolein charged to pyridine bases was determined for each run as is indicated in the table:

| Run No. | Catalyst | Temp., °C | Ratio of Ammonia to Acrolein in Charge, Mols | Throughput Mols total charge per lit. cat./hr. | Acrolein Converted to Pyridine Bases, Mol Per cent |
|---|---|---|---|---|---|
| 1 | Phosphoric Acid on Silica. | 385 | 5.7 | [1] 18.9 | 36.2 |
| 2 | Aluminum Phosphate. | 350 | 6.86 | [1] 11.04 | 40 |
| 3 | Adsorptive Alumina. | 375 | 5.5 | [1] 22.5 | 26.7 |
| 4 | do | 365 | 5.4 | [1] 30 | 22.6 |
| 5 | Copper-Alumina | 355 | 13.2 | 26.4 | 29 |
| 6 | Nickel-Nickel Oxide. | 350 | 12.0 | 26.4 | none |
| 7 | Phosphoric Acid-Alumina. | 350 | 13.5 | 25.8 | 35.9 |
| 8 | do | 350 | 11.8 | 24.0 | 33.5 |
| 9 | Boron Phosphate | 357 | 6.63 | 40.4 | 47.83 |
| 10 | do | 360 | 9.87 | 37.1 | 53.92 |

[1] Water added to the charge.

Although the invention has been described with particular reference to the production of 2-methyl pyridine (beta-picoline) from acrolein and ammonia, it is to be understood that it is in no wise limited thereto and may be applied to the reaction of other alpha,beta-unsaturated aldehydes with ammonia and/or primary aliphatic amines. Aldehydes which may be reacted with ammonia and/or primary aliphatic amines with particular advantage in the presence of a compound of boron and phosphorus in accordance with the invention comprise the alpha,beta-unsaturated straight chain aliphatic aldehydes of which the lowest member is acrolein. Examples of this particularly suitable class of aldehydes which may be employed comprise cortonaldehyde, acetaldehyde, propionaldehyde, n-butyraldehyde, n-valeraldehyde, n-capronaldehyde, n-heptaldehyde, etc.

The process of the invention may be executed in batch, semi-continuous or continuous operation. The process lends itself with advantage to efficient continuous operation. The reaction zone employed may comprise one or more reactors of the tubular and/or chamber type enabling efficient contact of the reactants with the catalyst employed. The catalyst may be employed in the form of a stationary or moving bed of solid catalyst, or in the form of a suspension or a fluidized state.

Effluence from the reaction zone may be subjected to any suitable product separation operation comprising one or more such steps as distillation, fractionation, solvent extraction, and the like, to effect the separation of a specific alkyl pyridine such as, for example, beta-picoline, from other reaction products and from unconverted material.

The invention claimed is:

1. A process for the production of beta-picoline which comprises reacting acrolein with ammonia in the presence of a molar excess of ammonia and a catalyst consisting essentially of boron phosphate at a temperature of from about 300° C. to about 400° C. with a throughput rate of from about 25 to about 75 mols of reactants per liter of catalyst per hour.

2. A process for the production of beta-picoline which comprises reacting acrolein with ammonia in the presence of a catalyst consisting essentially of boron phosphate at a temperature of from about 200° C. to about 500° C. with a throughput rate of from about 25 to about 75 mols of reactants per liter of catalyst per hour.

3. A process for the production of beta-picoline which comprises reacting acrolein with a primary aliphatic amine in the presence of a catalyst consisting essentially of boron phosphate at a temperature of from about 200° C. to about 500° C. with a throughput rate of from about 25 to about 75 mols of reactants per liter of catalyst per hour.

4. A process for the production of beta-picoline which comprises reacting acrolein with a member of the group consisting of ammonia and primary aliphatic amines in the presence of a catalyst consisting essentially of boron phosphate at a temperature of from about 200° C. to about 500° C. with a throughput rate of from about 25 to about 150 mols of reactants per liter of catalyst per hour.

5. A process for the production of mono-alkyl pyridine which comprises reacting a straight chain alpha,beta-unsaturated aliphatic aldehyde with ammonia in the presence of a molar excess of ammonia and a catalyst consisting essentially of boron phosphate at a temperature of from about 200° C. to about 500° C. with a throughput rate of from about 25 to about 150 mols of reactants per liter of catalyst per hour.

6. A process for the production of alkyl pyridine which comprises reacting a straight chain alpha,beta-unsaturated aliphatic aldehyde with ammonia in the presence of a catalyst consisting essentially of boron phosphate at a temperature of from about 200° C. to about 500° C. with a throughput rate of from about 25 to about 75 mols of reactants per liter of catalyst per hour.

7. A process for the production of alkyl pyridine which comprises reacting a straight chain alpha,beta-unsaturated aliphatic aldehyde with a primary aliphatic amine in the presence of a catalyst consisting essentially of boron phosphate at a temperature of from about 200° C. to about 500° C. with a throughput rate of from about 25 to about 75 mols of reactants per liter of catalyst per hour.

8. A process for the production of alkyl pyridine which comprises reacting a straight chain alpha-beta-unsaturated aliphatic aldehyde with a member of the group consisting of ammonia and aliphatic primary amines in the presence of a catalyst consisting of boron phosphate at a temperature of from about 200° C. to about 500° C. with a throughput rate of from about 25 to about 150 mols of reactants per liter of catalyst per hour.

GEORGE W. HEARNE.
VERNON W. BULS.

REFERENCES CITED

The following references are of record in the file of this patent:

FOREIGN PATENTS

| Number | Country | Date |
| --- | --- | --- |
| 332,623 | Great Britain | 1929 |

OTHER REFERENCES

Ser. No. 387,106, Stitz (A. P. C.), published July 13, 1943.